Oct. 3, 1961    E. P. BROWNING    3,002,393
POWER TAKE-OFF
Filed Oct. 29, 1959    2 Sheets-Sheet 1

INVENTOR.
E. P. BROWNING

Oct. 3, 1961     E. P. BROWNING     3,002,393
POWER TAKE-OFF
Filed Oct. 29, 1959                     2 Sheets-Sheet 2
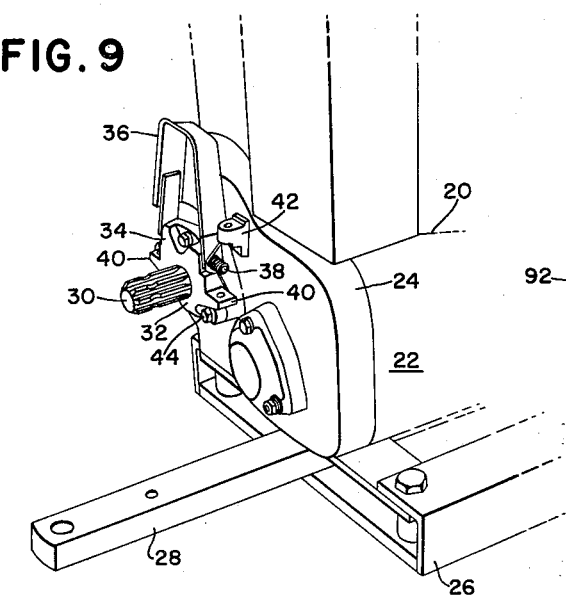
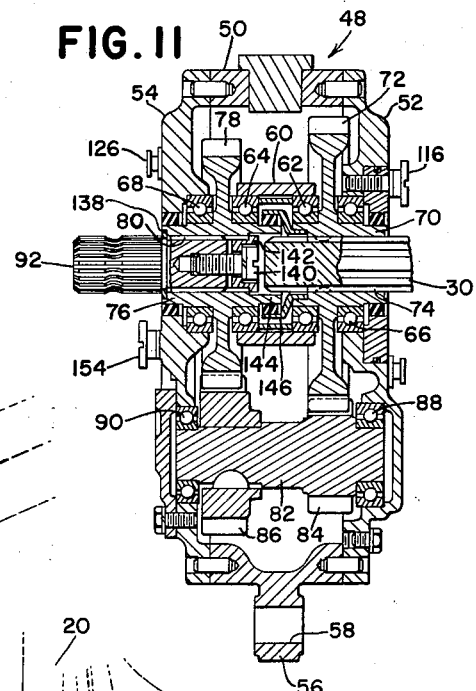
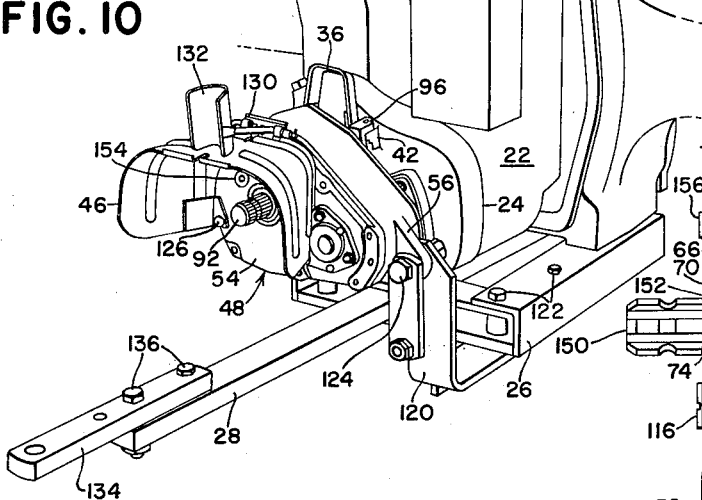
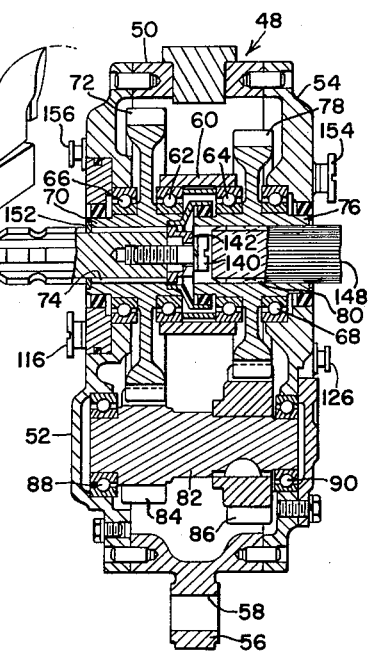
INVENTOR: E. P. BROWNING

United States Patent Office 3,002,393
Patented Oct. 3, 1961

3,002,393
POWER TAKE-OFF
Edgar P. Browning, Cedar Falls, Iowa, assignor to Deere & Company, Moline, Ill., a corporation of Delaware
Filed Oct. 29, 1959, Ser. No. 849,544
14 Claims. (Cl. 74—11)

This invention relates to a novel drive system finding particular utility in the power take-off drive system employed in conjunction with agricultural tractors and associated implements.

The broad idea of driving associated implements from the tractor by a power shaft driven either from the tractor engine or from the transmission is old, and its early popularity resulted in the setting up of standards relative to sizes, speeds of rotation and other characteristics. The first standards along these lines were introduced in 1923 and, among other things, established a speed of rotation of 540 r.p.m. Standardization of speed, as well as sizes, splines, locations relative to drawbars etc. enables the concomitant establishment of specifications which permit any standardized power take-off drive implement to be driven by any tractor equipped with a standardized power take-off shaft.

These standards have existed for thirty-five years but recently new standards have been introduced, involving primarily the increase of power take-off speed to 1000 r.p.m. and the use of a twenty-one-tooth involute-shaped spline in place of the old six-straight-sided spline, plus variations in the location of the shaft relative to hitch points etc. Although the new standards introduce many and significant advantages, they are not without certain disadvantages, primarily important among which is the requirement that either old implements be adapted to the new standards, especially as to speeds, or the new tractors be equipped with conversion mechanism for reducing the 1000 r.p.m. speed to the 540 r.p.m. speed for use with old implements. Likewise, it is desirable to provide conversion mechanism for increasing the old 540 r.p.m. speed for use with new implements. Further, the changes in the spline for the new standardized shaft means that this spline will not fit couplings built according to the old standards.

The present invention is concerned primarily with the provision of ratio-changing mechanism, provided particularly as an attachment, for use with tractors having power take-off shafts, and the mechanism is arranged so that it is capable of converting either power shaft speed to the higher or lower speed, as the case may be. Accordingly, the invention aims at the provision of an improved conversion transmission, adaptable to the power take-off system, for making the necessary conversion, as from 1000 r.p.m. to 540 r.p.m. or vice versa. It is a principal object of the invention to provide such transmission in the form of a housing-contained gearing which is so constructed as to be capable of inversion or reversibility to readily adapt itself to either of the two basic conditions that will be encountered. Other objects of the invention reside in improved means for mounting and dismounting the conversion mechanism and for facilitating the interchange of different types of power shafts.

The foregoing and other important objects and desirable features inherent in and encompassed by the invention will become apparent as a preferred embodiment of the invention is disclosed in detail, by way of example, in the ensuing description and accompanying sheets of drawings, the several figures of which are described immediately below.

FIG. 9 is a fragmentary perspective view of the rear portion of a tractor embodying the housing and power shaft arrangement of FIG. 1.

FIG. 10 is a similar perspective view showing the tractor equipped with the conversion housing and associated power take-off shield means.

FIG. 11 is a section, on an enlarged scale, as seen along the line 11—11 of FIG. 7, the arrangement showing the input as consisting of the 540 r.p.m. shaft and the output consisting of the 1000 r.p.m. shaft.

FIG. 12 is a similar sectional view in which the input and output are reversed.

Figure 3:
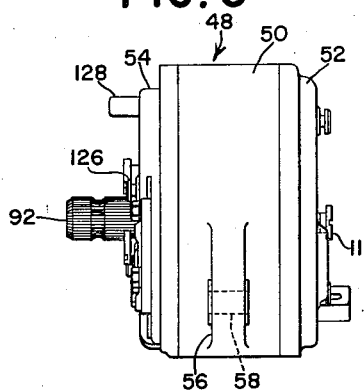
FIG. 3 is a side elevational view of the conversion housing.

Those familiar with the art with which the present invention is concerned will recognize in FIGS. 1, 4, 6, 9 and 10, the rear portion of an agricultural tractor, wherein the numeral 20 is used generally to designate the tractor body. As is typical, the tractor includes a rear transmission casing 22 to which is removably mounted in any convenient fashion a rear transmission housing cover 24; although, details in this respect may be varied and will vary from tractor to tractor. The numeral 26 designates a typical drawbar support from which a drawbar 28 projects rearwardly. A rearwardly projecting power shaft is designated by the numeral 30. In FIG. 9, this shaft is the conventional 540 r.p.m. shaft having six straight-sided splines. This shaft is driven in any suitable manner, by means not shown, as directly from the tractor transmission (not shown) or by driving connections directly from the tractor engine (also not shown). The internal driving details are assumed to be familiar to those versed in the art and therefore are not illustrated here.

According to the standards set up relative to power take-off shafts and related components, the shaft 30 is at a standardized distance above the drawbar 28 and, as already stated, has the standardized speed of 540 r.p.m.

In the particular type of tractor illustrated, the furnishing of the tractor with the power take-off shaft 30 involves the use of external mounting structure, here in the form of a combined bearing carrier and support 32, in this case provided with upper transversely apertured ears 34 by means of which a power take-off shield 36 is carried. Details of this character will vary from tractor to tractor, but all tractors will be equipped with a shield similar to that shown at 36 and the shield will be mounted by a pivot or the like, as shown at 38, so that it may be swung upwardly to the position shown in FIG. 9 to enable the mounting on the tractor of an additional shield when a power drive connection is utilized between the shaft 30 and an input or driven shaft on the implement, not shown. Shields of this character are well known and have been used for many years as safety equipment. For present purposes, the shield arrangement could be ignored, but is shown and described briefly for purposes of explanation of the background structure.

In addition to the shield-mounting ears 34, the bracket 32, in the instance shown here, has a pair of transversely spaced apart vertically apertured ears 40, one at each side of the power shaft 30. The apertured ears 40 are respectively in vertical alinement with and spaced below a pair of upper apertured ears 42. In this case, the ears 42 are integral with the rear mounting portion or transmission casing cover 24. The ears 40, as already describe, are part of the bracket 32 which is fastened to the structure 24 as by a plurality of cap screws 44. For all practical purposes, the ears 40 and 42 may be regarded as typical of representative mounting means which may be utilized in the mounting and dismounting of the conversion drive to be presently described. However, in the particular construction illustrated, the ears 40 and 42 may be used for mounting a larger shield than that shown at 36. Many examples of these shields are disclosed in the prior art and are assumed to be familiar to those versed in the art. Reference will be made later to a typical shield in connection with the conversion drive and, for present purposes, reference may be had briefly to FIG. 10 as showing such shield, which is designated here by the numeral 46. It will be understood that the same or a similar shield may be used with or without the conversion drive.

The conversion drive, best shown in FIGS. 3, 7, 8, 11 and 12, may be regarded as comprising a basic housing 48 having a main body 50 and front and rear walls 52 and 54 respectively. By way of orientation, it should be noted that the expression "front" is used with reference to the forward end of the tractor, or to the right as seen in the drawings. Moreover, present reference to the front and rear walls 52 and 54 of the housing is in connection with FIGS. 3, 7, 8, 10 and 11, because, as will be explained later, the housing in FIG. 12 is reversed from front to rear. Hence, for purposes of the understanding of the invention at this point, FIG. 12 is best ignored temporarily.

Figure 7:
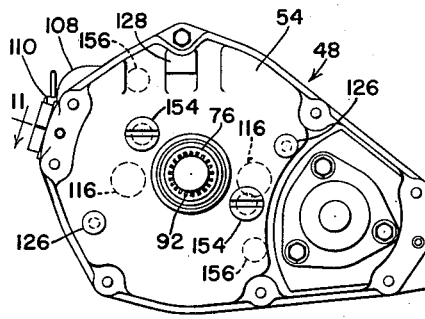
FIG. 7 is a rear view of the housing of FIG. 3.

As seen from the front or rear, the housing 48 is symmetrical as respects a line coincident with the line 11—11 shown in FIG. 7, the housing, when mounted in the position of FIG. 10, being somewhat enlarged at its left hand side and tapered at its right hand side, at which point it is provided with a mounting portion in the form of a lateral extension 56 which has a fore-and-aft bore 58 therein. The housing body 50 includes an internal bearing support 60 which carries front and rear bearings 62 and 64. The interior portions of the front and rear walls 52 and 54 respectively carry similar bearings 66 and 68. The forwardly positioned bearings 62 and 66 may be regarded as constituting a front pair which journal a hollow input shaft 70 which is actually the hub of a relatively large gear 72. This hollow shaft or hub is internally splined with six splines, at 74, matching those of the tractor power shaft 30.

The rearwardly located bearings 64 and 68 constitute a rear pair of bearings which support a hollow shaft 76, here again the hub of a somewhat smaller gear 78. The shaft 76, or hub of the gear 78, is coaxial with the input shaft 70 and may be regarded as an output shaft. This output shaft is internally splined at 80 in such a manner as to provide twenty-one involute splines. The two shafts 70 and 76, being independently supported, although coaxial, are relatively rotatable and are capable of being driven at different speeds by ratio-changing mechanism, here in the form of an idler shaft 82 having small and large pinions 84 and 86, respectively, which may be either keyed thereto or integral therewith. Opposite ends of the idler shaft 82 are journaled respectively in bearings 88 and 90 respectively in the front and rear walls 52 and 54. It will thus be seen that if the gear 72 is driven at one speed, the gear 78 will be driven at a different speed because of the gear ratio among the gears 72—84 and 86—78. In the particular case, the gear ratios are such that if the gear 70 is driven at 540 r.p.m., the ouput shaft 76, which is the hub of the gear 78, will rotate at 1000 r.p.m.

Figure 2:
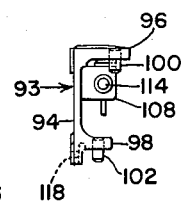
FIG. 2 is a side elevational view of a bracket or mounting means for adapting the conversion transmission to mounting on the structure of FIG. 1.
Figure 1:
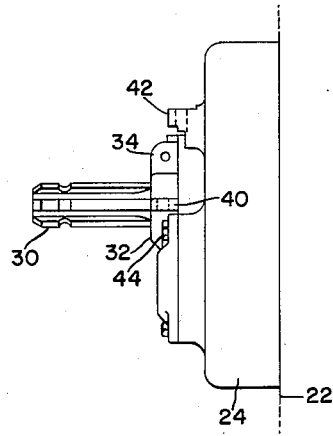
FIG. 1 is a fragmentary side elevational view of the rear portion of a transmission housing of a tractor equipped with a power shaft characterized by a standardized speed of 540 r.p.m. and a standardized spline and size design of six straight-sided splines.
Figure 5:
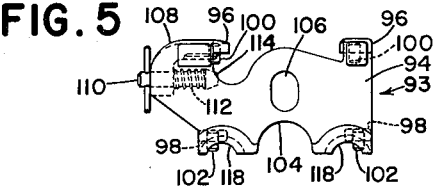
FIG. 5 is a rear view of the mounting means shown in FIG. 2.
Figure 4:
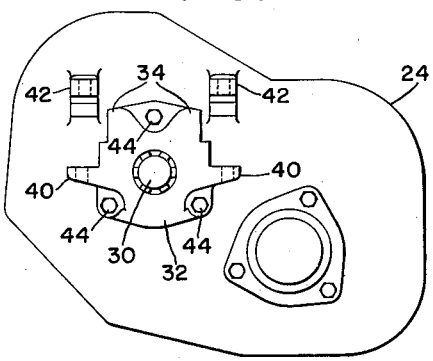
FIG. 4 is a rear view of the structure shown in FIG. 1.
Figure 6:
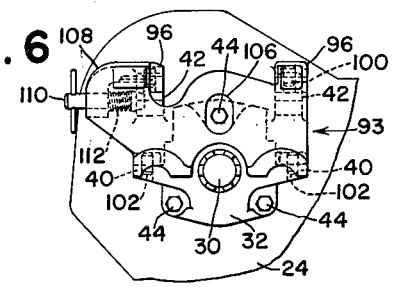
FIG. 6 is a rear view of the mounting means shown in position on a portion of the structure of FIG. 4.

In the adaptation of the housing 48 to the structure of FIGS. 1 or 9, to produce the structure of FIG. 10, the hollow input shaft 70 is coaxially receivable of the tractor power shaft 30, and the output shaft 76 is equipped with a power-transmitting or power take-off shaft 92 which is externally splined with twenty-one involute splines to match the twenty-one involute internal splining of the hollow output shaft 76. When the housing is so mounted, it is secured in place by retaining means indicated in its entirety by the numeral 93 and best shown in FIGS. 2, 5, 6, and 8. This retainer comprises a main body 94 having a pair of upper lugs 96 and a pair of lower lugs 98. As seen in FIG. 2, the lugs 96 and 98 project forwardly and the upper lugs are equipped with depending rigid pins 100 and lower pins 102 are provided respectively for the lower lugs 98. The retainer is mounted on the rear portion 24 of the tractor by moving the retainer forwardly and then downwardly, the pins 100 and 102 entering the respective aperatures in the tractor-mounted ears 42 and 40. This gives the result shown in FIG. 6. From FIG. 5 it will be noted that the retainer is notched at 104 to accommodate the tractor power shaft 30 and is further apertured at 106 to accommodate the upper of the several cap screws 44. The retainer is releasably locked in place by latch means comprising an extension 108 of one of the upper ears 96, which extension is horizontally transversely bored to receive a latch pin 110 which in turn is spring loaded at 112 and which has a head 114 engageable under the proximate ear 42 on the tractor portion 24. It will be readily seen that the latch pin 110 can be withdrawn to the left (FIG. 5; to the right, FIG. 8) so as to withdraw the head 114 from beneath the proximate ear 42, whereupon the retainer may be moved upwardly to free its pins from the tractor lugs 40 and 42.

Figure 8:
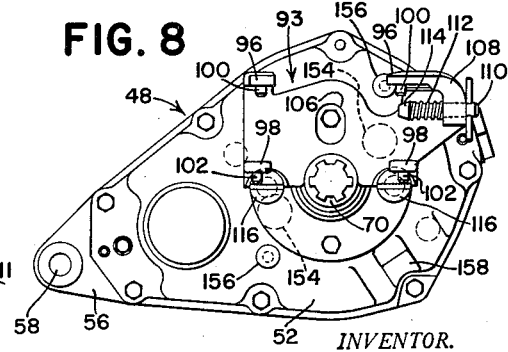
FIG. 8 is a front view of the housing of FIG. 3, with the mounting means of FIG. 2 mounted thereon.

The retainer 93 is also capable of receiving mounting means on the front wall 52 of the conversion drive housing 48. For this purpose, the front wall is provided with a pair of diametrically related headed studs 116, and the body portion 94 of the retainer is of wall-like construction and has a pair of diametrically related downwardly opening notches 118 which respectively receive the headed studs 116 when the retainer is mounted on the housing (FIG. 8). The manner of installation involves first the downward insertion of the retainer 93 relative to the housing 48 so that the notches 118 in the retainer body 94 engage the studs 116 on the front wall 52 of the housing. The housing and retainer may then be moved forwardly, the tractor power shaft 30 being coaxially received in the hollow internally splined input shaft 70 of the drive mechanism in the housing 48. It will be necessary then to lift the retainer so that the pins 100 and 102 pass respectively above the tractor ears or lugs 42 and 40, after which the retainer may be moved downwardly and latched by the means 110—114. Another form of assembly may involve moving the housing onto the shaft 30 so that the housing and casing 24 are spaced apart sufficiently to receive the retainer. The retainer may then be downwardly inserted. In either event, the downwardly projecting pins 100 and 102 and the downwardly opening notches 118 are so arranged that securing of the housing 48 in place is accomplished while assuring perfect coaxiality between the shaft 30 and the hollow shaft 70.

When the housing 48 is thus positioned, it is additionally mounted in place by means including the previously described extension 56 which has the fore-and-aft bore 58 therethrough, together with a supporting bracket 120 which may be easily secured, as by bolts 122, to the right hand side of the drawbar support 26. The bracket turns upwardly as seen in FIG. 10 and is apertured to receive a fore-and-aft bolt 124 which is passed through the aperture 58 in the housing extension 56. The construction of the retainer 93 is such as to hold the housing in place against fore-and-aft shifting, and the mounting at 56—120 is such as to take any torque imposed on the housing 48.

In this situation, the 1000 r.p.m. driving or power shaft 92 is exposed to the rear, and thus the 540 r.p.m. output of the tractor shaft 30 is converted to 1000 r.p.m. output at the shaft 92.

As previously described, the ultimate assembly may be equipped with the shield 46. For this purpose, the rear wall 54 has thereon a pair of shield-mounting studs 126, substantially diametrically related as respects the axis of the shaft 92. Any form of means may be used for mounting the shield, as typical slotted connections (not shown), familiar to those versed in the art. In addition, the rear wall is provided with an upper lug 128 which also supports the shield 46. The cap screw adjacent to the lug 128 is used to mount a bracket 130 for carrying a shield 132 which functions in a manner similar to that previously described at 36. In the particular instance shown, when the shield 46 is removed, the shield 132 can move downwardly and rearwardly to lie in protective relationship to the exposed 1000 r.p.m. shaft 92.

When the conversion drive is utilized, the 1000 r.p.m. power shaft 92 is of course farther to the rear than the original 540 r.p.m. shaft 30. Since this changes the relationship between the power take-off and the drawbar 28, it is necessary to use a drawbar extension, which may take any form, such as the extension 134, which may be secured to the end of the drawbar 28 as by bolts 136.

When the 1000 r.p.m. shaft 92, having the twenty-one splines, is inserted axially forwardly into the hollow, internally-splined output shaft 76, the forward insertion thereof is limited by a snap ring 138, received in an annular groove in the shaft 92, and the shaft is releasably retained by means of a cap screw 140 and a collar 142. The front end of the shaft 92 is axially bored and tapped to receive the cap screw 140 (FIG. 11) and the collar 142 is so shaped as to abut the shoulder formed by the front ends of the internal splines 80 in the shaft 76. As will be seen, the front end of the shaft 92 is axially spaced rearwardly from the rear end of the shaft 30 and the collar 142 and the head of the cap screw 140 are accommodated in this space. The end of the hub or hollow shaft 76 is extended forwardly at 144 so as to loosely surround the rear end of the shaft 30 when the shaft 30 is received in the hollow input shaft or hub 70. In addition to this, an annular seal member 146 surrounds the junction of the two shafts 92 and 30. Hence, when both shafts are removed; that is, when the shaft 92 is withdrawn rearwardly from the housing and the housing is withdrawn rearwardly from the shaft 30, foreign matter entering the hollow shafts 70 or 76 cannot get into the interior of the housing.

The foregoing outlines the structure, function and results of the conversion housing or drive 48 in converting a 540 r.p.m. power output to a 1000 r.p.m. power output. It is just as important, on the other hand, that a tractor having a 1000 r.p.m. output be convertible to an ultimate output having an r.p.m. of 540. For this purpose, the housing 48 can be reversed and therefore is made symmetrical about the line represented by the section line 11—11 in FIG. 7. This line, as will be seen, is drawn through the axis of the shafts 70—76 and the axis of the fore-and-aft mounting bore 58. When reversal is accomplished, the housing 48, being dismounted from the tractor, provides access through the tubular shaft or hub 70 for a tool which is used to remove the cap screw 140. Since the cap screw is slotted, it will be seen that an ordinary screw driver may be used for this purpose. When the cap screw is removed, the shaft 92 may be withdrawn rearwardly. This shaft is not used in the reversed conversion.

Instead, the tractor will be equipped with a power output shaft 148, which will be comparable to the previously described power shaft 30, except that the shaft 148 will have twenty-one external splines thereon. The housing 48 is then reversed about the aforesaid line of symmetry and the front wall 52 now becomes the rear wall and the rear wall 54 becomes the front wall. This is clearly shown in FIG. 12. In that situation, the shaft or hub 76, previously described as having twenty-one internal splines for receiving the power shaft 92 in FIG. 11, is now at the front and is therefore capable of axially receiving the 1000 r.p.m. power shaft 148. Before the housing 48 is mounted on the tractor via the shaft 148—76, a 540 r.p.m. power take-off shaft 150 is inserted forwardly into the now rearwardly facing hollow shaft or hub 70. The collar 142 is now reversed as respects its position in FIG. 11, but nevertheless is used in retaining the shaft 150, the front end of this shaft being axially bored and tapped to receive the cap screw 140. An external snap ring 152 is used on the shaft 150 to limit forward insertion of the shaft into the hollow shaft or hub 70. The extension 56 is of course in a plane midway between the front and rear walls of the housing 48 and therefore is capable of receiving the bolt 124, whereby the housing 48 is mountable on the drawbar bracket 120 in either position. Thus, the housing is also symmetrical from front to rear, as well as at opposite sides of the line 11—11.

In this phase of the utility of the mechanism, the retainer 93 is still used to connect the reversed housing 48 to the tractor, and this is readily achievable because the rear wall 54, which becomes the front wall in FIG. 12, has thereon a pair of studs 154 identical to those previously described at 116 but positioned as shown in FIGS. 7 and 8 to accommodate the reversed position of the housing 48. As will be seen in the two figures just mentioned, the studs 154 are substantially diametrically opposed at opposite sides of the axis of the shafts 30—76 but are symmetrical as respects the line 11—11 in the relationship thereof to the front studs 116. Consequently, when the housing is reversed, the studs 154 occupy the positions previously occupied by the studs 116, and vice versa. FIG. 12 illustrates one stud 116 and one stud 154, the former now being at the rear and the latter now being at the front so as to receive the retainer 93 in the manner previously described.

Also, in this situation, the shield-receiving studs 126, formerly at the rear of the structure, will now be at the front. However, the wall 52, now at the rear (FIG. 12), has thereon a pair of shield-mounting studs 156, and these receive and mount the shield 46.

Further than this, the front wall 52 has thereon a projecting lug 158, which is identical to and located symmetrically as respects the previously described lug 128. Hence, when the housing 48 is reversed, the lug 128 becomes forwardly and downwardly disposed and the lug 158 takes the place of the lug 128, and therefore serves to mount the shield structure 46. The cap screw adjacent to the lug 158 mounts the bracket 130 and small shield 132. As will be readily seen from FIGS. 7 and 8, the studs and lugs are symmetrically arranged so that the proper components are properly positioned, irrespective of the position of the housing 48; that is to say, irrespective of which wall 52 or 54 is forwardly or rearwardly. This adds materially to the reversibility of the mechanism 48 for use in converting either power output 30 or 148 to the ultimate output at 92 or 150. Of course, when the mechanism is reversed, the gear ratio is in the opposite direction. That is, in FIG. 11, the gear ratio increases the 540 output to 1000 r.p.m. and in FIG. 12 the ratio reduces the 1000 r.p.m. output to 540.

Features and advantages of the invention, not categorically enumerated, will readily occur to those versed in the art, as will many modifications and alterations in the preferred embodiment disclosed, all of which may be achieved without departure from the spirit and scope of the invention.

What is claimed is:

1. In combination with a tractor having a body including a rear wall and a power shaft projecting rearwardly from said wall: a housing positioned rearwardly of the rear wall and having a front face closely spaced behind said wall, said housing having an input shaft projecting forwardly beyond said face and coaxially connectible to and disconnectible from the power shaft; and means removably mounting the housing on the tractor body for forward movement of the housing to connect the power and input shafts and for rearward shifting of the housing to disconnect said shafts, said means including a first element on the tractor wall, a second element on the housing front face, a retaining member insertable in the space between said face and wall in a direction radial to the power shaft axis and engaging both elements for holding the housing against rearward shifting and selectively removable in the opposite direction for disengaging said elements, and a lock device operative between said member and one of the elements for releasably securing the member against removal.

2. The invention defined in claim 1, in which: each element is in the form of a headed lug and the member has a pair of recesses therein respectively engaging said lugs.

3. The invention defined in claim 1, in which: the housing has a rear face and a second shaft projecting rearwardly from said rear face, and a third element is provided on said rear face like the element on the front face so that the housing is capacitated for reversal from front to rear for removable mounting in reversed position via the element on the tractor wall, said rear face element and said retaining member.

4. The invention defined in claim 1, including: second mounting means on the housing spaced radially from the second element as respects the axis of the input shaft axis and engageable with the tractor to accommodate torque reaction transmitted to the housing by the power shaft.

5. A convertible power drive mechanism, comprising: a housing having front and rear walls provided respectively with front and rear openings coaxial on a fore-and-aft axis; drive means in the housing including front and rear coaxial shafts accessible respectively at said front and rear openings; a mounting portion on the housing in laterally spaced relation to said axis, said housing being reversible from front to rear about a straight line radial to said axis and intersecting said mounting portion whereby said mounting portion occupies its same relative position while the front and rear shafts change positions but still lie on said axis; front and rear mounting elements respectively on said front and rear faces and of similar construction and located symmetrically as respects said axis and said line so that upon reversal of the housing as aforesaid the front elements occupy the former positions of the rear elements and vice versa.

6. The invention defined in claim 5, including: front and rear similar support portions respectively on said front and rear walls and located symmetrically as respects said axis and line so that upon reversal of the housing as aforesaid the front portion occupies the former position of the rear portion and vice versa.

7. A convertible power drive mechanism, comprising: a housing having front and rear walls provided respectively with front and rear openings coaxial on a fore-and-aft axis; drive means in the housing including front and rear coaxial tubular shafts accessible respectively at said front and rear openings and having inner end portions spaced apart axially within the housing; an extension shaft coaxially received by and projecting rearwardly from the rear shaft and having an inner end portion proximate to the inner end portion of the rear shaft; a captive retainer in the space between the inner end portions of the front and rear shafts and confined against radial displacement and adapted to abut the inner end portion of said rear shaft; and means selectively engageable and disengageable between the retainer and the inner end of portion of the extension shaft and accessible via the tubular front shaft.

8. The invention defined in claim 7, in which: the retainer has an axial bore therethrough, the inner end portion of the extension shaft has a tapped bore therein, and the selective means is a threaded member passed through the retainer bore and threaded into the extension shaft bore and having a head engaging the retainer.

9. The invention defined in claim 7, in which: the axial length of the retainer is less than the axial spacing between the inner end portions of the front and rear shafts so as to be capable of axial shifting in said space without radial displacement, and said retainer being so constructed as to be capable of selectively abutting the rear end portion of the front shaft.

10. A convertible power drive mechanism for use with tractors and implements, comprising: a housing having front and rear walls provided respectively with front and rear openings coaxial on a fore-and-aft axis; an input shaft journaled in the housing and having a tubular internally splined front end coaxially accessible at said front opening; an output shaft journaled in the housing coaxially with and rotatable relative to the input shaft and having a tubular internally splined rear end axially accessible at said rear opening; ratio-changing gearing in the housing and drivingly interconnecting the input and output shafts for rotation thereof respectively at different speeds; external front mounting means on the front wall concentrically related to the input shaft; and similar external rear mounting means on the rear wall concentrically related to the output shaft.

11. A convertible power take-off for a tractor having a body including a rearwardly projecting externally splined power shaft, comprising: a housing having front and rear walls provided respectively with front and rear openings coaxial on a fore-and-aft axis; an input shaft journaled in the housing and having a tubular front end coaxially accessible at said front opening and having internal splines matching those of the tractor power shaft and coaxially receiving said power shaft; an output shaft journaled in the housing coaxially with and rotatable relative to the input shaft and having a tubular rear end accessible at said rear opening and having internal splines different from those in the input shaft; ratio-changing gearing in the housing and drivingly interconnecting the input and output shafts for rotation thereof respectively at different speeds; a power take-off shaft having a front end provided with external splines matching the internal splines of the output shaft and forwardly inserted into and carried by said output shaft; means for removably mounting the housing on the tractor body, including a first mounting element on the front wall proximate to the front opening and a second mounting element spaced laterally from the first element and connectible to the tractor in laterally spaced relation to the power shaft; and said housing being symmetrical as respects a line through the second element and the axis of the input and output shafts so as to be reversible from front to rear, whereby the output shaft, with the power take-off shaft removed, projects forwardly on the axis of the tractor power shaft and the input shaft projects coaxially rearwardly, and said rear wall including a third mounting element like the first mounting element and symmetrically located as respects the aforesaid line so that the reversed housing is connectible to the tractor via the second and third elements.

12. A convertible power take-off for a tractor having a body including a rearwardly projecting externally splined power shaft, comprising: a housing having front and rear walls provided respectively with front and rear openings coaxial on a fore-and-aft axis; an input shaft journaled in the housing and having a tubular front end coaxially accessible at said front opening and having internal splines matching those of the tractor power shaft and coaxially receiving said power shaft; an output shaft journaled in the housing coaxially with and rotatable relative to the input shaft and having a tubular rear end accessible at said rear opening and having internal splines different from those in the input shaft; ratio-changing gearing in the housing and drivingly interconnecting the input and output shafts for rotation thereof respectively at different speeds; a power take-off shaft having a front end provided with external splines matching the internal splines of the output shaft and forwardly inserted into and carried by said output shaft; said input and output shafts being tubular throughout their respective lengths and the power take-off shaft projecting into the output shaft to such extent that its front end is axially spaced rearwardly from the rear end of the tractor power shaft; and means for removably securing the power take-off shaft to the output shaft and located in the space between said ends of the power take-off and power shafts and rearwardly accessible via the tubular input shaft when the tractor power shaft is withdrawn from said input shaft.

13. A convertible power drive mechanism for use with tractors and implements, comprising: a housing having front and rear walls provided respectively with front and rear openings coaxial on a fore-and-aft axis; an intermediate interior support spaced between said walls and having an opening therethrough coaxial with the wall openings; a front gear having a hollow hub journaled in the front opening and in the support; a rear gear having a hollow hub journaled in the support and in the rear opening; said gears having different pitch diameters; an idler shaft journaled in the housing on an axis parallel to the gear axis and having front and rear pinions of different pitch diameters and respectively in mesh with the front and rear gears; said front and rear hubs being internally splined, the front hub having splines different in size and number from those in the rear hub, and the rear end of the front hub and the front end of the rear hub being axially spaced apart; and an internal seal between said ends, comprising an annular member surrounding both hub ends and of such axial length as to bridge the space between said ends.

14. A convertible power drive mechanism for use with tractors and implements, comprising: a housing having front and rear walls provided respectively with front and rear openings coaxial on a fore-and-aft axis; an intermediate interior support spaced between said walls and having an opening therethrough coaxial with the wall openings; a front gear having a hollow hub journaled in the front opening and in the support; a rear gear having a hollow hub journaled in the support and in the rear opening; said gears having different pitch diameters; an idler shaft journaled in the housing on an axis parallel to the gear axis and having front and rear pinions of different pitch diameters and respectively in mesh with the front and rear gears; said front and rear hubs being internally splined, the front hub having splines different in size and number from those in the rear hub, and the rear end of the front hub and the front end of the rear hub being axially spaced apart; and an internal shaft retainer disposed in said space and adapted to abut said hub ends, said retainer having an axial opening therethrough.

References Cited in the file of this patent
UNITED STATES PATENTS

| | | |
|---|---|---|
| 2,445,417 | Bohannon | July 20, 1948 |
| 2,618,980 | Cook et al. | Nov. 15, 1952 |
| 2,624,416 | Larsen | Jan. 6, 1953 |
| 2,640,374 | Willis | June 2, 1953 |
| 2,645,944 | Crichton et al. | July 21, 1953 |
| 2,810,293 | George et al. | Oct. 22, 1957 |
| 2,851,896 | Ordway | Sept. 16, 1958 |
| 2,886,982 | Thomas | May 19, 1959 |